US 12,185,275 B2

(12) United States Patent
Liu (10) Patent No.: US 12,185,275 B2
(45) Date of Patent: Dec. 31, 2024

(54) METHOD FOR MONITORING PAGING OCCASION, COMMUNICATION DEVICE AND STORAGE MEDIUM (71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 365 days.

(21) Appl. No.: 17/773,584

(22) PCT Filed: Nov. 5, 2019

(86) PCT No.: PCT/CN2019/115753
§ 371 (c)(1),
(2) Date: Apr. 29, 2022

(87) PCT Pub. No.: WO2021/087755
PCT Pub. Date: May 14, 2021

(65) Prior Publication Data
US 2022/0394663 A1 Dec. 8, 2022

(51) Int. Cl.
*H04W 68/00* (2009.01)
*H04W 24/08* (2009.01)
*H04W 72/0446* (2023.01)
*H04W 72/0453* (2023.01)
*H04W 72/23* (2023.01)

(52) U.S. Cl.
CPC ......... *H04W 68/005* (2013.01); *H04W 24/08* (2013.01); *H04W 72/0446* (2013.01); *H04W 72/0453* (2013.01); *H04W 72/23* (2023.01)

(58) Field of Classification Search
CPC ............... H04W 68/005; H04W 24/08; H04W 72/0446; H04W 72/0453; H04W 72/23;
(Continued)

(56) References Cited

U.S. PATENT DOCUMENTS 10,034,269 B2   7/2018   Sun et al.
10,412,704 B2   9/2019   Sun et al.
(Continued)

FOREIGN PATENT DOCUMENTS

CN    108632961 A    10/2018
CN    109076352 A    12/2018
CN    110167109 A    8/2019

OTHER PUBLICATIONS

International Search Report of PCT Application No. PCT/CN2019/115753 dated Aug. 12, 2020 with English translation, (4p).
(Continued)

*Primary Examiner* — Dady Chery
(74) *Attorney, Agent, or Firm* — Arch & Lake LLP (57) ABSTRACT A method for monitoring a PO is provided. The method is applicable to a terminal in a NR-U system. A paging cycle of the terminal includes an original PO and at least one extended PO of the original PO. The original PO and the extended PO form a PO window. The method includes: receiving, at a first PO, paging downlink control information (Paging DCI), carried in a paging physical downlink control channel (PDCCH) scrambled by a paging radio network temporary identity (P-RNTI), from an access network device, in which the first PO is one of the original PO and the extended PO; and determining to stop monitoring, other PO located after the first PO, in the paging cycle, based on an indicator bit of the Paging DCI.

18 Claims, 3 Drawing Sheets (58) Field of Classification Search
CPC . H04W 68/02; H04W 16/14; H04W 74/0808; Y02D 30/70
See application file for complete search history.

(56) References Cited

U.S. PATENT DOCUMENTS

| | | | |
|---|---|---|---|
| 2017/0303236 A1* | 10/2017 | Sun | H04W 68/005 |
| 2018/0288738 A1 | 10/2018 | Sun et al. | |
| 2019/0306827 A1* | 10/2019 | Agiwal | H04L 5/001 |
| 2020/0022105 A1* | 1/2020 | Fu | H04W 52/0229 |
| 2022/0039061 A1* | 2/2022 | Murray | H04W 56/001 |
| 2022/0095270 A1* | 3/2022 | Shih | H04W 76/11 |

OTHER PUBLICATIONS

ZTE Corporation, "Increasing time-domain paging occasions for NR-U", 3GPP TSG-RAN WG2 Meeting #106, R2-1906318, Reno, USA, May 13-17, 2019, (3p).

Intellectual Property India, The Patent Office, Office Action of Application No. 202247031747 dated Jun. 10, 2022, with English translation.(7p).

Extended European Search Report issued in Application No. 19951538.8, dated Dec. 10, 2022, (25p).

Nokia, Nokia Shanghai Bell, "Paging in NR-U", 3GPP TSG-RAN WG2 #107, R2-1909243, Prague, Czech Republic, Aug. 26-30, 2019, (3p).

InterDigital, "Paging in NR-U", 3GPP RAN WG2 #107bis, R2-1912887, Revision of R2-1909602, Chongqing, China, Oct. 14-18, 2019, (3p).

Offline discussion rapporteur (ZTE)."Offline 109: Stopping condition for monitoring additional paging occasions in NR-J", 3GPP TSG-WG2 Meeting #107 R2-19yxxxx Prague, Czech Republic, Aug. 26-30, 2019, (6p).

Vivo, "Short message for stopping paging monitoring", 3GPP TSG-RAN WG2 Meeting #109 electronic, R2-2000151, E-Meeting, Feb. 24-Mar. 6, 2020, (2p).

\* cited by examiner

METHOD FOR MONITORING PAGING OCCASION, COMMUNICATION DEVICE AND STORAGE MEDIUM

CROSS-REFERENCE TO RELATED APPLICATION

This application is a U.S. national phase of International Application No. PCT/CN2019/115753, filed on Nov. 5, 2019, the entire content of which is incorporated herein by reference for all purposes.

TECHNICAL FIELD

The disclosure relates to the field of communication technologies, and in particular to a method for monitoring a paging occasion (PO), a communication device and a storage medium.

BACKGROUND

A design on the 5$^{th}$ generation mobile communication technology (5G) new radio in unlicensed spectrum (NR-U) should comply with relevant regulations in major regions around the world, including relevant requirements for listen before talk (LBT): a base station monitors, before transmitting data, whether there are other devices transmitting data on a channel of the unlicensed spectrum; and if there are other devices transmitting data, the base station postpones transmitting its own data to a terminal.

In a NR-U system, if the base station fails to transmit a paging message at a PO to the terminal due to a LBT failure, the performance of the NR-U system will be affected. To reduce an impact of the LBT failure on the PO, the 5G standard formulation organization designed an extended PO, that is, an original PO is extended exponentially based on a number of synchronization signal blocks (SSBs), to avoid that the terminal is affected to receive the paging message when the base station has the LBT failure.

However, under the design of extended PO, when the terminal does not receive a paging schedule at the PO, the terminal still needs to continuously monitor the extended PO after the PO since the terminal does not know a reason of not receiving the paging schedule (for example, the base station has the LBT failure or the LBT succeed but the base station does not need to transmit the paging schedule), which causes the power consumption of the terminal.

SUMMARY

According to an aspect of the disclosure, a method for monitoring a PO is provided. The method is applicable to a terminal in a NR-U system. A paging cycle of the terminal includes an original PO and at least one extended PO of the original PO. The original PO and the extended PO form a PO window. The method includes: receiving, at a first PO, paging downlink control information (Paging DCI), carried in a paging physical downlink control channel (PDCCH) scrambled by a paging radio network temporary identity (P-RNTI), from an access network device, in which the first PO is one of the original PO and the extended PO; and determining to stop monitoring, other PO located after the first PO, in the paging cycle, based on an indicator bit of the Paging DCI.

According to an aspect of the disclosure, a method for monitoring a PO is provided. The method is applicable to an access network device in a NR-U system. The method includes: performing, at a first PO, LBT on a terminal, in which a paging cycle of the terminal includes an original PO and at least one extended PO of the original PO and the original PO and the extended PO form a PO window; and transmitting, Paging DCI, carried in a paging PDCCH scrambled by a P-RNTI, to the terminal in response to that the LBT is successful at the first PO, in which the first PO is one of the original PO and the extended PO and an indicator bit of the Paging DCI is configured to instruct the terminal to stop monitoring other PO located after the first PO in the paging cycle.

According to an aspect of the disclosure, a terminal is provided. The terminal includes: a processor; a transceiver connected to the processor; and a memory for storing executable instructions of the processor; in which the processor is configured to load and execute the executable instructions to perform the method for monitoring a PO according to the above aspect.

BRIEF DESCRIPTION OF THE DRAWINGS

To more clearly describe technical solutions in examples of the disclosure, it will briefly introduce the drawings needed in the description of examples in the following. Obviously, the drawings in the following description are only some examples of the disclosure. For those of ordinary skill in the art, without creative labor, other drawings may be obtained based on these drawings.

DETAILED DESCRIPTION

Reference will now be described in detail to examples, which are illustrated in the accompanying drawings. The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

First, a brief introduction to terms and implementation environments involved in examples of the disclosure will be given before describing in detail the method for monitoring a PO according to examples of the disclosure.

NR-based unlicensed spectrum: a spectrum for communication of radio device, which is divided by countries and regions. This spectrum is usually considered to be a shared spectrum, that is, communication devices in different communication systems can use this spectrum as long as they meet regulations set by countries and regions on the spectrum and there is no need to apply for a proprietary spectrum license from the government.

Messages carried in Paging downlink control information (DCI): including paging scheduling information and/or a short message. The paging scheduling information is configured to schedule and allocate a resource location located by a paging message; and the short message includes System Info Modification, earthquake and tsunami warning system indication (Etws-Indication), commercial mobile alert system indication (Cmas-Indication), extended access barring parameter modification (Eab-Param Modification), Redistribution Indication, System Info Modification Extended Discontinuous Reception (System Info Modification-eDRX) and Paging Record (including S-Temporary Mobile Station Identifier (S-TMSI) or International Mobile Subscriber Identity (IMSI) and other messages). If the short message only includes a system-info-modification-type message (such as System Info Modification, Etws-Indication, Cmas-Indication, Eab-Param Modification, Redistribution Indication and System Info Modification-eDRX), this type of message can be directly carried in the Paging DCI, which is called direct indication.

Figure 1:
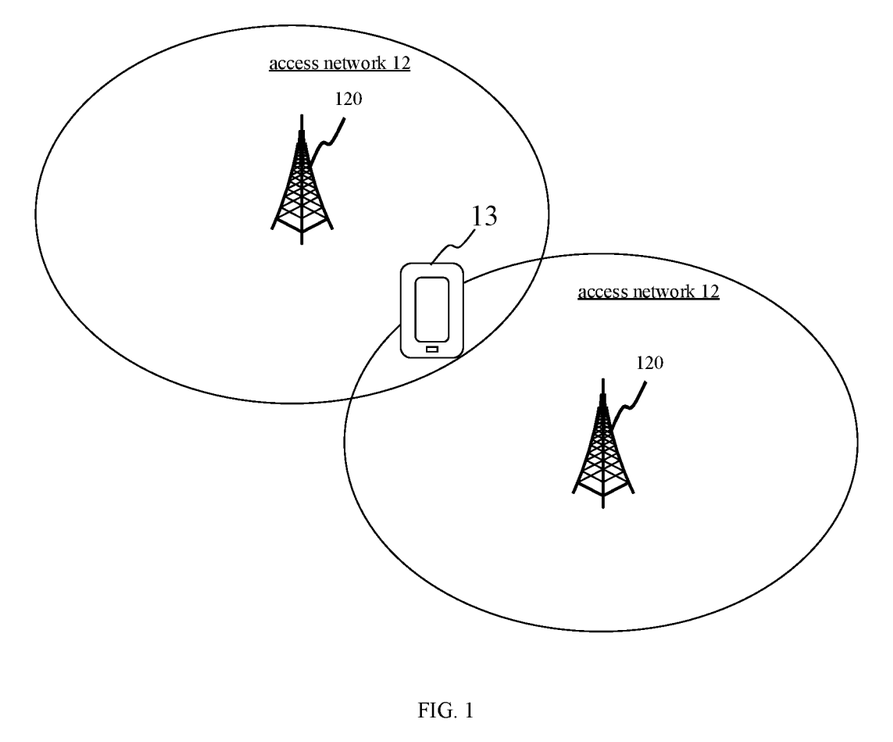
FIG. 1 is a block diagram illustrating a communication system, according to some examples of the disclosure.

FIG. 1 is a block diagram illustrating a communication system, according to some examples of the disclosure. The communication system works on the NR-based unlicensed spectrum and includes an access network 12 and a terminal 13.

The access network 12 includes several access network devices 120. The access network device 120 may be a base station. The base station is a device deployed in the access network to provide a wireless communication function for the terminal. The base stations may include various forms of macro base stations, micro base stations, relay stations, access points and the like. In the 5G NR-U system, the device with a base station function is called gNodeB or gNB. As communication technologies evolve, the description of "base station" may change.

The terminals 13 may include various handheld devices, vehicle-mounted devices, wearable devices and computing devices with wireless communication functions, other processing devices connected to wireless modems, as well as various forms of user equipment, mobile stations (MSs), terminal devices and the like. For ease of description, the devices mentioned above are collectively referred to as terminals. The access network device 120 and the terminal 13 communicate with each other through a certain air interface technology, such as a Uu interface.

It should be noted that the following examples of the disclosure only take the terminal accessing the access network device as an example for illustration. After understanding the technical solutions of the disclosure, those of ordinary skill in the art will easily think of applying the method for stopping monitoring of the PO provided by the disclosure to other methods for stopping monitoring of the PO in subsequent evolutions and applying to situations where other terminals access other access network devices. These extended solutions should be included in the protection scope of the disclosure.

Figure 2:
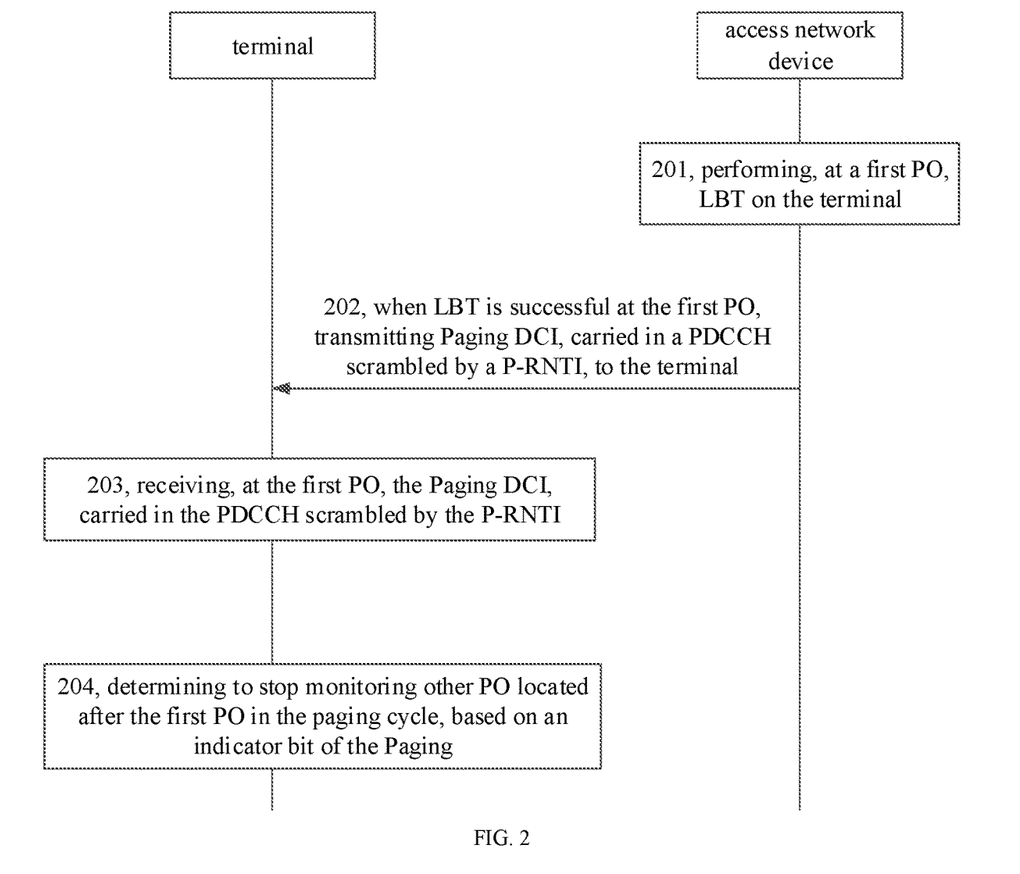
FIG. 2 is a flow chart illustrating a method for monitoring a PO, according to some examples of the disclosure.

FIG. 2 is a flow chart illustrating a method for monitoring a PO, according to some examples of the disclosure. The method is applicable to a terminal and an access network device in a NR-U system. A paging cycle of the terminal includes an original PO and at least one extended PO of the original PO. The original PO and the extended PO(s) form a PO window. The method includes the following.

201: the access network device performs, at a first PO, LBT on the terminal.

The first PO is one of the original PO and the extended PO(s).

Optionally, the extended PO is, a candidate PO located after the original PO, in the paging cycle. The number of extended PO(s) is one or more, which is not limited in examples of the disclosure.

LBT means that the access network device, before transmitting data, first monitors whether there are other devices transmitting data on the channel of the unlicensed spectrum; and if there are other devices transmitting data, it postpones transmitting its own data to the terminal.

In the paging cycle, if LBT of the access network device is unsuccessful and the access network device may not transmit a paging message to the terminal at the original PO, the access network device will continue to try to transmit the paging message to the terminal at the extended PO located after the original PO, to prevent the terminal from missing the paging message in the paging cycle.

202: when LBT is successful at the first PO, the access network device transmits Paging DCI, carried in a PDCCH scrambled by a P-RNTI, to the terminal.

An indicator bit in the Paging DCI is configured to instruct the terminal to stop monitoring other PO, located after the first PO, in the paging cycle.

Optionally, P-RNTI is configured to identify a transmission of the paging message.

Optionally, the access network device transmits the Paging DCI at the first PO to notify whether the terminal is paged, the system information has changed and the like.

203: the terminal receives at the first PO the Paging DCI carried in the paging PDCCH scrambled by the P-RNTI from the access network device.

The first PO is one of the original PO and the extended PO(s).

Optionally, the extended PO is, a candidate PO located after the original PO, in the paging cycle. The number of extended PO(s) is one or more, which is not limited in examples of the disclosure.

Optionally, the original PO and the extended PO(s) form a PO window. A length of the PO window in the time domain is limited. The length of the PO window is in units of subframes.

In the paging cycle, if LBT of the access network device is unsuccessful and the access network device may not transmit a paging message to the terminal at the original PO, the access network device will continue to try to transmit the paging message to the terminal at the extended PO located after the original PO, to prevent the terminal from missing the paging message in the paging cycle.

Optionally, P-RNTI is configured to identify a transmission of the paging message.

Optionally, the terminal determines whether it is paged or the system information changes by receiving the Paging DCI at the first PO.

When the terminal is paged, the Paging DCI carries paging scheduling information and the paging scheduling information is for the terminal; and when the system information (such as System Info Modification, Etws-Indication, Cmas-Indication, Eab-Param Modification, Redistribution Indication, System Info Modification-eDRX) changes, the Paging DCI carries a short message and the short message is for all terminals in the cell.

When the terminal monitors that the paging PDCCH has its own paging scheduling information at the first PO, the terminal receives a physical downlink shared channel (PDSCH) based on the Paging DCI carried on the paging PDCCH to obtain the paging information.

Exemplarily, one paging cycle includes the original PO, a first extended PO, a second extended PO and a third extended PO. The first PO is the original PO. The terminal receives, at the first PO, the Paging DCI carried in the paging PDCCH scrambled by the P-RNTI from the access network device.

Exemplarily, one paging cycle includes the original PO, a first extended PO, a second extended PO and a third extended PO. The first PO is the first extended PO. The terminal receives, at the first extended PO, the Paging DCI carried in the paging PDCCH scrambled by the P-RNTI from the access network device.

204: it is determined to stop monitoring, other PO located after the first PO, in the paging cycle, based on the indicator bit of the Paging DCI.

Optionally, the indicator bit of the Paging DCI carries indication information. The indication information is configured to instruct the terminal whether to monitor other PO located after the first PO in the paging cycle.

Optionally, the Paging DCI is Paging DCI carrying paging scheduling information; or, the Paging DCI is Paging DCI carrying a short message; or, the Paging DCI is Paging DCI carrying paging scheduling information and a short message; or, Paging DCI is Paging DCI not carrying Paging scheduling information and a short message.

Exemplarily, one paging cycle includes the original PO, a first extended PO, a second extended PO and a third extended PO. The first PO is the original PO. The terminal receives, at the first PO, the Paging DCI carried in the paging PDCCH scrambled by the P-RNTI from the access network device. The Paging DCI is the Paging DCI that carries the short message. The indication information is determined based on the indicator bit of the Paging DCI. The indication information is configured to indicate not to continue to monitor other POs located after the first PO in the paging cycle, that is, the terminal will not monitor the POs (including the first extended PO, the second extended PO and the third extended PO) located after the original PO.

Exemplarily, one paging cycle includes the original PO, a first extended PO, a second extended PO and a third extended PO. The first PO is the first extended PO. The terminal receives, at the first extended PO, the Paging DCI carried in the paging PDCCH scrambled by the P-RNTI from the access network device. The Paging DCI is the Paging DCI that carries the short message. The indication information is determined based on the indicator bit of the Paging DCI. The indication information is configured to indicate not to continue to monitor other POs located after the first PO in the paging cycle, that is, the terminal will not monitor the POs (including the second extended PO and the third extended PO) located after the first extended PO.

In an example, a format of the Paging DCI is fallback format 1-0.

Optionally, DCI is content transmitted in PDCCH. DCI has a variety of formats. Different formats are used according to different purposes and scenarios. The fallback format 1-0 is a DCI format used for downlink scheduling allocation. An information field of the fallback format 1-0 is not configurable.

In summary, in the method provided in some examples, the terminal receives, at the first PO, the Paging DCI transmitted by the access network device and determines whether to monitor other PO located after the first PO in the paging cycle based on the indicator bit of the Paging DCI. It is avoided that the terminal always monitors other PO located after the first PO when the LBT of the access network device succeeds but there is no need to perform paging scheduling, thereby saving the power of the terminal.

In some optional examples based on FIG. 2, the indicator bit of the Paging DCI includes at least one bit in target reserved bits and the target reserved bits is one of groups of reserved bits in the Paging DCI.

Reserved bits are bits that do not carry relevant information in the Paging DCI transmitted by the access network device this time.

Optionally, regardless of the content carried by the Paging DCI, the information field located by the target reserved bits is a fixed information field.

Optionally, when the content carried by the Paging DCI is different, the information field located by the target reserved bits is different and the number of bits corresponding to the target reserved bits may also be different.

Optionally, the indicator bit of the Paging DCI includes at least one bit. Some examples of the disclosure may not limit the number of the indicator bit(s) of the Paging DCI. The terminal determines indication information based on the indicator bit of the Paging DCI. The indication information is configured to indicate whether to continue to monitor other PO located after the first PO in the paging cycle.

Exemplarily, regarding the location of the target reserved bits, the disclosure provides at least the following three solutions.

Solution 1, the target reserved bits include 2 bits in a short-message-indicator information field.

Optionally, in this solution, the target reserved bits are located in the short-message-indicator information field. The short-message-indicator information field corresponds to 2 bits.

TABLE 1

| short message indicator | |
|---|---|
| bit field | short message indicator |
| 00 | reserved bits |
| 01 | The Paging DCI only carries paging scheduling information |
| 10 | The Paging DCI only carries a short message |
| 11 | The Paging DCI carries paging scheduling information and a short message |

R15 introduces a short message indicator in the Paging DCI to notify a type of paging. As shown in Table 1, the short message indicator corresponds to 2 bits: 00 are reserved bits; 01 are used to indicate that the Paging DCI only carries paging scheduling information; 10 are used to indicate that the Paging DCI only carries a short message; and 11 are used to indicate that the Paging DCI carries paging scheduling information and a short message.

Optionally, the indicator bit of the Paging DCI includes the reserved bits 00 of the short-message-indicator information field.

Exemplarily, in the paging cycle, when the terminal receives the Paging DCI at the first PO and determines that the indicator bits of the short-message-indicator information field in the Paging DCI are 00, it is determined that the LBT of the access network device at the first PO is successful and the terminal will stop monitoring the PO after the first PO and enter sleep, thereby achieving the effect of power saving.

In summary, in the method provided in some examples, the terminal receives, at the first PO, the Paging DCI transmitted by the access network device and determines whether to monitor other PO located after the first PO in the paging cycle based on the indicator bit of the Paging DCI. It is avoided that the terminal always monitors other PO located after the first PO when the LBT of the access network device succeeds but there is no need to perform paging scheduling, thereby saving the power of the terminal.

Through the reserved bits 00 of the short-message-indicator information field, the terminal determines that the LBT has succeeded in the access network device at the first PO and the terminal will stop monitoring the PO after the first PO and enter sleep, thereby achieving the effect of saving power.

Solution 2, the target reserved bits include 6 redundant bits among 8 bits in a short message information field.

Optionally, in this solution, the target reserved bits are located in the short message information field. The short message information field includes 8 bits, among which the target reserved bits are 6 redundant bits (the third bit to the eighth bit or bits 3-8) among the 8 bits.

Optionally, regardless of the content of the information carried by the Paging DCI, the 6 redundant bits are not used to indicate other paging related information to the terminal.

TABLE 2

| short message | |
|---|---|
| bit | short message |
| 1 | System Info Modification |
| 2 | Etws And Cmas Indication |
| 3-8 | reserved bits |

As shown in Table 2, the short message information field corresponds to 8 bits: bit 1 is a system-info-modification bit, in which if this bit is set to 1, it is used to indicate broadcast control channel (BCCH) modification in addition to system information block6 (SIB6), SIB7 and SIB8; bit 2 is a system-info-modification bit, in which if this bit is set to 1, it is used to indicate an Etws main notification, and/or an Etws minor notification, and/or a Cmas notification; and bits 3-8 are reserved bits.

Optionally, the indicator bit of the Paging DCI includes at least one of the reserved bits, bits 3-8, of the short message information field.

Exemplarily, in the paging cycle, when the terminal receives the Paging DCI at the first PO and determines that the indicator bit of the short message information field (bit 3 of the short message information field) in the Paging DCI is 0, it is determined that the LBT of the access network device at the first PO is successful and the terminal will stop monitoring the PO after the first PO and enter sleep, thereby achieving the effect of power saving.

Exemplarily, in the paging cycle, when the terminal receives the Paging DCI at the first PO and determines that the indicator bits of the short message information field (bits 3-4 of the short message information field) in the Paging DCI are 00, it is determined that the LBT of the access network device at the first PO is successful and the terminal will stop monitoring the PO after the first PO and enter sleep, thereby achieving the effect of power saving.

Exemplarily, in the paging cycle, when the terminal receives the Paging DCI at the first PO and determines that the indicator bits of the short message information field (bits 6-8 of the short message information field) in the Paging DCI are 000, it is determined that the LBT of the access network device at the first PO is successful and the terminal will stop monitoring the PO after the first PO and enter sleep, thereby achieving the effect of power saving.

In summary, in the method provided in some examples, the terminal receives, at the first PO, the Paging DCI transmitted by the access network device and determines whether to monitor other PO located after the first PO in the paging cycle based on the indicator bit of the Paging DCI. It is avoided that the terminal always monitors other PO located after the first PO when the LBT of the access network device succeeds but there is no need to perform paging scheduling, thereby saving the power of the terminal.

The terminal uses at least one of the 6 redundant bits among the 8 bits of the short message information field to determine that the LBT of the access network device at the first PO is successful and the terminal will stop monitoring the PO after the first PO and enter sleep, thereby achieving the effect of power saving.

Solution 3, the information field located by the target reserved bits is different based on the different content carried by the Paging DCI.

The Paging DCI carries content in four cases: the Paging DCI not carrying paging scheduling information and a short message, the Paging DCI only carrying paging scheduling information, the Paging DCI only carrying a short message and the Paging DCI carrying paging scheduling information and a short message.

In the above four cases, the location of the target reserved bits is as follows.

(1) The Paging DCI is Paging DCI not carrying paging scheduling information and a short message.

The target reserved bits include 2 bits in a short-message-indicator information field; or, the target reserved bits include 8 bits in a short message information field; or, the target reserved bits include a frequency-domain-allocation information field; or, the target reserved bits include 4 bits of a time-domain-allocation information field; or, the target reserved bits include 1 bit of a mapping information field from a VRB to a PRB; or, the target reserved bits include 5 bits of a modulation-and-coding information field; or, the target reserved bits include 2 bits of a TB ratio information field; or, the target reserved bits include 6 bits of original reserved bits.

Optionally, when the Paging DCI is Paging DCI not carrying paging scheduling information and a short message, as shown in Tables 1 and 2, reserved bits 00 in the short-message-indicator information field or 8 reserved bits in the short message information field are used as two groups of reserved bits.

Optionally, when the Paging DCI is Paging DCI not carrying paging scheduling information and a short message, the frequency-domain-allocation information field, the time-domain-allocation information field, the mapping information field from VRB to PRB, the modulation-and-coding information field and the TB ratio information field of the Paging DCI are reserved and may not carry relevant information for indicating the paging scheduling of the terminal. The above 6 information fields are regarded as 6 groups of reserved bits.

Optionally, the original reserved bits are bits that are not used by the base station to notify the terminal of paging related information in the Paging DCI regardless of the content carried by the Paging DCI. The 6 bits of the above-mentioned original reserved bits are regarded as one group of reserved bits.

The indicator bit of the Paging DCI includes at least one bit in one of the multiple groups of reserved bits of the Paging DCI.

Exemplarily, in the paging cycle, when the terminal receives the Paging DCI at the first PO and determines that the indicator bits of the short-message-indicator information field in the Paging DCI are 00, it is determined that the LBT of the access network device at the first PO is successful and the terminal will stop monitoring the PO after the first PO and enter sleep, thereby achieving the effect of power saving.

Exemplarily, in the paging cycle, when the terminal receives the Paging DCI at the first PO and determines that the indicator bits (bits 1-2) of the time-domain-allocation information field in the Paging DCI are 00, it is determined that the LBT of the access network device at the first PO is successful and the terminal will stop monitoring the PO after the first PO and enter sleep, thereby achieving the effect of power saving.

Exemplarily, in the paging cycle, when the terminal receives the Paging DCI at the first PO and determines that the indicator bits (bits 1-3) of the original reserved bits in the Paging DCI are 000, it is determined that the LBT of the access network device at the first PO is successful and the terminal will stop monitoring the PO after the first PO and enter sleep, thereby achieving the effect of power saving.

(2) The Paging DCI is Paging DCI Only Carrying Paging Scheduling Information.

The target reserved bits include 2 bits in a short-message-indicator information field; or, the target reserved bits include 8 bits in a short message information field; or, the target reserved bits include 6 bits of original reserved bits.

Optionally, when the Paging DCI is Paging DCI only carrying paging scheduling information, as shown in Table 1, reserved bits 00 in the short-message-indicator information field are used as a group of reserved bits.

Optionally, the original reserved bits are bits that are not used by the base station to notify the terminal of paging related information in the Paging DCI regardless of the content carried by the Paging DCI. The 6 bits of the above-mentioned original reserved bits are regarded as one group of reserved bits.

The indicator bit of the Paging DCI includes at least one bit in one of the multiple groups of reserved bits of the Paging DCI.

Exemplarily, in the paging cycle, when the terminal receives the Paging DCI at the first PO and determines that the indicator bits of the short-message-indicator information field in the Paging DCI are 00, it is determined that the LBT of the access network device at the first PO is successful and the terminal will stop monitoring the PO after the first PO and enter sleep, thereby achieving the effect of power saving.

Exemplarily, in the paging cycle, when the terminal receives the Paging DCI at the first PO and determines that the indicator bits (bits 1-3) of the original reserved bits in the Paging DCI are 000, it is determined that the LBT of the access network device at the first PO is successful and the terminal will stop monitoring the PO after the first PO and enter sleep, thereby achieving the effect of power saving.

(3) The Paging DCI is Paging DCI Only Carrying a Short Message.

The target reserved bits include 2 bits in a short-message-indicator information field; or, the target reserved bits include 6 redundant bits among 8 bits in a short message information field; or, the target reserved bits include a frequency-domain-allocation information field; or, the target reserved bits include 4 bits of a time-domain-allocation information field; or, the target reserved bits include 1 bit of a mapping information field from a VRB to a PRB; or, the target reserved bits include 5 bits of a modulation-and-coding information field; or, the target reserved bits include 2 bits of a TB ratio information field; or, the target reserved bits include 6 bits of original reserved bits.

Optionally, when the Paging DCI is Paging DCI only carrying a short message, as shown in Tables 1 and 2, reserved bits 00 in the short-message-indicator information field or 6 redundant bits among 8 bits in the short message information field are used as two groups of reserved bits.

Optionally, when the Paging DCI is Paging DCI only carrying a short message, the frequency-domain-allocation information field, the time-domain-allocation information field, the mapping information field from VRB to PRB, the modulation-and-coding information field and the TB ratio information field of the Paging DCI are reserved and may not carry relevant information for indicating the paging scheduling of the terminal. The above 6 information fields are regarded as 6 groups of reserved bits.

Optionally, the original reserved bits are bits that are not used by the base station to notify the terminal of paging related information in the Paging DCI regardless of the content carried by the Paging DCI. The 6 bits of the above-mentioned original reserved bits are regarded as one group of reserved bits.

The indicator bit of the Paging DCI includes at least one bit in one of the multiple groups of reserved bits of the Paging DCI.

Exemplarily, in the paging cycle, when the terminal receives the Paging DCI at the first PO and determines that the indicator bits of the short message information field (bits 6-8 of the short message information field) in the Paging DCI are 000, it is determined that the LBT of the access network device at the first PO is successful and the terminal will stop monitoring the PO after the first PO and enter sleep, thereby achieving the effect of power saving.

Exemplarily, in the paging cycle, when the terminal receives the Paging DCI at the first PO and determines that the indicator bits (bits 1-2) of the time-domain-allocation information field in the Paging DCI are 00, it is determined that the LBT of the access network device at the first PO is successful and the terminal will stop monitoring the PO after the first PO and enter sleep, thereby achieving the effect of power saving.

Exemplarily, in the paging cycle, when the terminal receives the Paging DCI at the first PO and determines that the indicator bits (bits 1-3) of the original reserved bits in the Paging DCI are 000, it is determined that the LBT of the access network device at the first PO is successful and the terminal will stop monitoring the PO after the first PO and enter sleep, thereby achieving the effect of power saving.

(4) The Paging DCI is Paging DCI Carrying Paging Scheduling Information and a Short Message.

The target reserved bits include 2 bits in a short-message-indicator information field; or, the target reserved bits include 6 redundant bits among 8 bits in a short message information field; or the target reserved bits include 6 bits of original reserved bits.

Optionally, when the Paging DCI is Paging DCI carrying paging scheduling information and a short message, as shown in Tables 1 and 2, reserved bits 00 in the short-message-indicator information field or 6 redundant bits among 8 bits in the short message information field are used as two groups of reserved bits.

Optionally, the original reserved bits are bits that are not used by the base station to notify the terminal of paging related information in the Paging DCI regardless of the content carried by the Paging DCI. The 6 bits of the above-mentioned original reserved bits are regarded as one group of reserved bits.

The indicator bit of the Paging DCI includes at least one bit in one of the multiple groups of reserved bits of the Paging DCI.

Exemplarily, in the paging cycle, when the terminal receives the Paging DCI at the first PO and determines that the indicator bits of the short message information field (bits 6-8 of the short message information field) in the Paging DCI are 000, it is determined that the LBT of the access network device at the first PO is successful and the terminal will stop monitoring the PO after the first PO and enter sleep, thereby achieving the effect of power saving.

Exemplarily, in the paging cycle, when the terminal receives the Paging DCI at the first PO and determines that the indicator bits (bits 1-2) of the original reserved bits in the Paging DCI are 00, it is determined that the LBT of the access network device at the first PO is successful and the terminal will stop monitoring the PO after the first PO and enter sleep, thereby achieving the effect of power saving.

In summary, in the method provided in some examples, the terminal receives, at the first PO, the Paging DCI transmitted by the access network device and determines whether to monitor other PO located after the first PO in the paging cycle based on the indicator bit of the Paging DCI. It is avoided that the terminal always monitors other PO located after the first PO when the LBT of the access network device succeeds but there is no need to perform paging scheduling, thereby saving the power of the terminal.

Depending on the content carried by the Paging DCI, the information field located by the target reserved bits is different. The terminal determines that the LBT has succeeded in the network access device at the first PO through the indicator bit of at least one bit in one of the multiple groups of reserved bits. The terminal will stop monitoring the PO after the first PO and enter sleep to save power.

Figure 3:
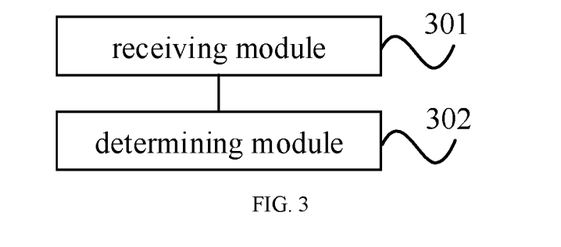
FIG. 3 is a block diagram illustrating an apparatus for monitoring a PO, according to some examples of the disclosure.

FIG. 3 is a block diagram illustrating an apparatus for monitoring a PO, according to some examples of the disclosure. The apparatus includes a receiving module 301 and a determining module 302.

The receiving module 301 is configured to receive, at a first PO, Paging DCI, carried in a paging PDCCH scrambled by a P-RNTI, from an access network device, in which the first PO is one of the original PO and the extended PO.

The determining module 302 is configured to determine to stop monitoring, other PO located after the first PO, in the paging cycle, based on an indicator bit of the Paging DCI.

In some examples, the indicator bit of the Paging DCI includes at least one bit in target reserved bits and the target reserved bits is one of groups of reserved bits in the Paging DCI.

In some examples, the target reserved bits include 2 bits in a short-message-indicator information field.

In some examples, the target reserved bits include 6 redundant bits among 8 bits in a short message information field.

In some examples, the Paging DCI is Paging DCI not carrying paging scheduling information and a short message, the target reserved bits include 2 bits in a short-message-indicator information field; or, the target reserved bits include 8 bits in a short message information field; or, the target reserved bits include a frequency-domain-allocation information field; or, the target reserved bits include 4 bits of a time-domain-allocation information field; or, the target reserved bits include 1 bit of a mapping information field from a VRB to a PRB; or, the target reserved bits include 5 bits of a modulation-and-coding information field; or, the target reserved bits include 2 bits of a TB ratio information field; or, the target reserved bits include 6 bits of original reserved bits.

In some examples, the Paging DCI is Paging DCI only carrying paging scheduling information, the target reserved bits include 2 bits in a short-message-indicator information field; or, the target reserved bits include 8 bits in a short message information field; or, the target reserved bits include 6 bits of original reserved bits.

In some examples, the Paging DCI is Paging DCI only carrying a short message, the target reserved bits include 2 bits in a short-message-indicator information field; or, the target reserved bits include 6 redundant bits among 8 bits in a short message information field; or, the target reserved bits include a frequency-domain-allocation information field; or, the target reserved bits include 4 bits of a time-domain-allocation information field; or, the target reserved bits include 1 bit of a mapping information field from a VRB to a PRB; or, the target reserved bits include 5 bits of a modulation-and-coding information field; or, the target reserved bits include 2 bits of a TB ratio information field; or, the target reserved bits include 6 bits of original reserved bits.

In some examples, the Paging DCI is Paging DCI carrying paging scheduling information and a short message, the target reserved bits include 2 bits in a short-message-indicator information field; or, the target reserved bits include 6 redundant bits among 8 bits in a short message information field; or, the target reserved bits include 6 bits of original reserved bits.

In some examples, a format of the Paging DCI is fallback format 1-0.

Figure 4:
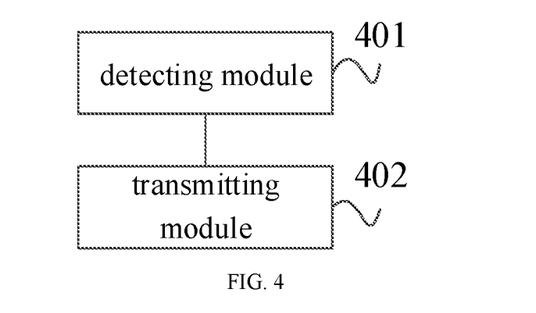
FIG. 4 is a block diagram illustrating an apparatus for monitoring a PO, according to some examples of the disclosure.

FIG. 4 is a block diagram illustrating an apparatus for monitoring a PO, according to some examples of the disclosure. The apparatus includes a detecting module 401 and a transmitting module 402.

The detecting module 401 is configured to perform, at a first PO, LBT on a terminal, in which a paging cycle of the terminal includes an original PO and at least one extended PO of the original PO and the original PO and the extended PO form a PO window.

The transmitting module 402 is configured to transmit, Paging DCI, carried in a paging PDCCH scrambled by a P-RNTI, to the terminal in response to that the LBT is successful at the first PO, in which the first PO is one of the original PO and the extended PO.

An indicator bit of the Paging DCI is configured to instruct the terminal to stop monitoring other PO located after the first PO in the paging cycle.

In some examples, the indicator bit of the Paging DCI includes at least one bit in target reserved bits and the target reserved bits is one of groups of reserved bits in the Paging DCI.

In some examples, the target reserved bits include 2 bits in a short-message-indicator information field.

In some examples, the target reserved bits include 6 redundant bits among 8 bits in a short message information field.

In some examples, the Paging DCI is Paging DCI not carrying paging scheduling information and a short message, the target reserved bits include 2 bits in a short-message-indicator information field; or, the target reserved bits include 8 bits in a short message information field; or, the target reserved bits include a frequency-domain-allocation information field; or, the target reserved bits include 4 bits of a time-domain-allocation information field; or, the target reserved bits include 1 bit of a mapping information field from a VRB to a PRB; or, the target reserved bits include 5 bits of a modulation-and-coding information field; or, the target reserved bits include 2 bits of a TB ratio information field; or, the target reserved bits include 6 bits of original reserved bits.

In some examples, the Paging DCI is Paging DCI only carrying paging scheduling information, the target reserved bits include 2 bits in a short-message-indicator information field; or, the target reserved bits include 8 bits in a short message information field; or, the target reserved bits include 6 bits of original reserved bits.

In some examples, the Paging DCI is Paging DCI only carrying a short message, the target reserved bits include 2 bits in a short-message-indicator information field; or, the target reserved bits include 6 redundant bits among 8 bits in a short message information field; or, the target reserved bits include a frequency-domain-allocation information field; or, the target reserved bits include 4 bits of a time-domain-allocation information field; or, the target reserved bits include 1 bit of a mapping information field from a VRB to a PRB; or, the target reserved bits include 5 bits of a modulation-and-coding information field; or, the target reserved bits include 2 bits of a TB ratio information field; or, the target reserved bits include 6 bits of original reserved bits.

In some examples, the Paging DCI is Paging DCI carrying paging scheduling information and a short message, the target reserved bits include 2 bits in a short-message-indicator information field; or, the target reserved bits include 6 redundant bits among 8 bits in a short message information field; or, the target reserved bits include 6 bits of original reserved bits.

In some examples, a format of the Paging DCI is fallback format 1-0.

Figure 5:
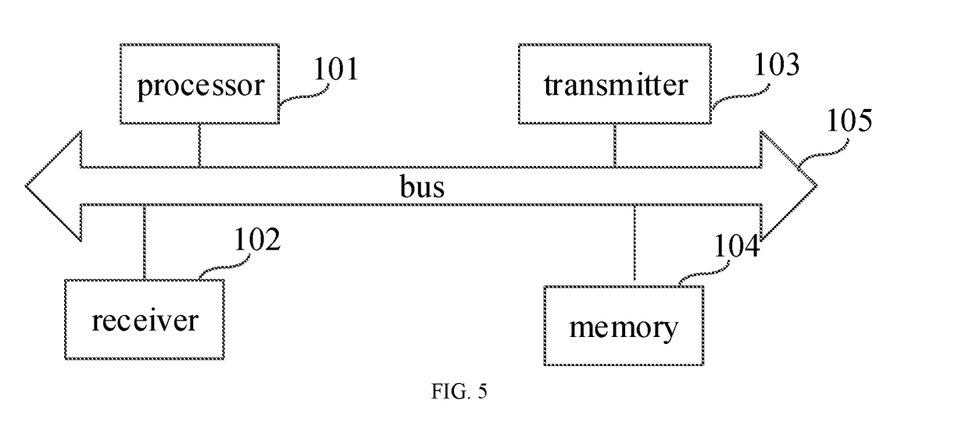
FIG. 5 is a block diagram illustrating a communication device, according to some examples of the disclosure.

FIG. 5 is a block diagram illustrating a communication device (a terminal or an access network device), according to some examples of the disclosure. The terminal includes: a processor 101, a receiver 102, a transmitter 103, a memory 104 and a bus 105.

The processor 101 includes one or more processing cores. The processor 101 executes various functional applications and information processing by running software programs and modules.

The receiver 102 and the transmitter 103 may be implemented as a communication component. The communication component may be a communication chip.

The memory 104 is connected to the processor 101 through the bus 105.

The memory 104 may be configured to store at least one instruction. The processor 101 is configured to execute the at least one instruction to implement each action in the foregoing method examples.

In addition, the memory 104 may be implemented using any type of volatile or non-volatile memory devices, or a combination thereof. The volatile or non-volatile memory device include, but is not limited to: a magnetic disk or optical disk, an electrically erasable programmable read-only memory (EEPROM), an erasable programmable read-only memory (EPROM), a static random access memory (SRAM), a read-only memory (ROM), a magnetic memory, a flash memory, a programmable read-only memory (PROM).

In some examples, a computer-readable storage medium is also provided. The computer-readable storage medium stores at least one instruction, at least one program, a code set or an instruction se. The at least one instruction, the at least one program, the code set or the instruction set is loaded and executed by the processor to implement the method for monitoring a PO provided by the foregoing method examples.

Those of ordinary skill in the art can understand that all or part of the actions in the above-mentioned examples can be completed by hardware or by a program instructing relevant hardware. The program can be stored in a computer-readable storage medium. The storage medium mentioned can be a read-only memory, a magnetic disk, an optical disk or the like.

The above are only optional examples of the disclosure and are not intended to limit the disclosure. Any modification, equivalent replacement, improvement, etc. made within the spirit and principle of the disclosure shall be included in the protection range of the disclosure.

What is claimed is:

1. A method for monitoring a paging occasion (PO), comprising:
receiving, by a terminal in a new-radio-in-unlicensed-spectrum (NR-U) system at a first PO, paging downlink control information (Paging DCI), carried in a paging physical downlink control channel (PDCCH) scrambled by a paging radio network temporary identity (P-RNTI), from an access network device, wherein the first PO is one of the original PO and the extended PO, wherein a paging cycle of the terminal comprises an original PO and at least one extended PO of the original PO, the original PO and the extended PO form a PO window;
determining, by the terminal, to stop monitoring, other PO that is located after the first PO in the paging cycle, based on an indicator bit of the Paging DCI,
wherein the indicator bit of the Paging DCI comprises at least one bit in target reserved bits, and the target reserved bits is one of groups of reserved bits in the Paging DCI; and
in response to determining that content carried by the Paging DCI being different content, determining an information field located by the target reserved bits based on the different content and a number of bits corresponding to the target reserved bits based on the different content.

2. The method as claimed in claim 1, wherein,
the target reserved bits comprise 2 bits in a short-message-indicator information field.

3. The method as claimed in claim 1, wherein,
the target reserved bits comprise 6 redundant bits among 8 bits in a short message information field.

4. The method as claimed in claim 1, wherein the Paging DCI is Paging DCI not carrying paging scheduling information and a short message, and
the target reserved bits comprise 2 bits in a short-message-indicator information field; or
the target reserved bits comprise 8 bits in a short message information field; or
the target reserved bits comprise a frequency-domain-allocation information field; or
the target reserved bits comprise 4 bits of a time-domain-allocation information field; or
the target reserved bits comprise 1 bit of a mapping information field from a virtual resource block (VRB) to a physical resource block (PRB); or,
the target reserved bits comprise 5 bits of a modulation-and-coding information field; or
the target reserved bits comprise 2 bits of a transport block (TB) ratio information field; or
the target reserved bits comprise 6 bits of original reserved bits.

5. The method as claimed in claim 1, wherein the Paging DCI is Paging DCI only carrying paging scheduling information, and
the target reserved bits comprise 2 bits in a short-message-indicator information field; or
the target reserved bits comprise 8 bits in a short message information field; or
the target reserved bits comprise 6 bits of original reserved bits.

6. The method as claimed in claim 1, wherein the Paging DCI is Paging DCI only carrying a short message, and
the target reserved bits comprise 2 bits in a short-message-indicator information field; or
the target reserved bits comprise 6 redundant bits among 8 bits in a short message information field; or
the target reserved bits comprise a frequency-domain-allocation information field; or
the target reserved bits comprise 4 bits of a time-domain-allocation information field; or
the target reserved bits comprise 1 bit of a mapping information field from a virtual resource block (VRB) to a physical resource block (PRB); or
the target reserved bits comprise 5 bits of a modulation-and-coding information field; or
the target reserved bits comprise 2 bits of a transport block (TB) ratio information field; or
the target reserved bits comprise 6 bits of original reserved bits.

7. The method as claimed in claim 1, wherein the Paging DCI is Paging DCI carrying paging scheduling information and a short message, and
the target reserved bits comprise 2 bits in a short-message-indicator information field; or
the target reserved bits comprise 6 redundant bits among 8 bits in a short message information field; or
the target reserved bits comprise 6 bits of original reserved bits.

8. The method as claimed in claim 1, wherein a format of the Paging DCI is fallback format 1-0.

9. A non-statutory computer-readable storage medium, comprising a programmable logic circuit or program instructions, wherein when the programmable logic circuit or program instructions are executed, the method for monitoring a PO according to claim 1 is performed.

10. A method for monitoring a paging occasion (PO), comprising:
performing, by an access network device in a new-radio-in-unlicensed-spectrum (NR-U) system at a first PO, listen before talk (LBT) on a terminal, wherein a paging cycle of the terminal comprises an original PO and at least one extended PO of the original PO and the original PO and the extended PO form a PO window;
transmitting, by the access network device, paging downlink control information (Paging DCI), carried in a paging physical downlink control channel (PDCCH) scrambled by a paging radio network temporary identity (P-RNTI), to the terminal in response to that the LBT is successful at the first PO, wherein the first PO is one of the original PO and the extended PO, wherein an indicator bit of the Paging DCI is configured to instruct the terminal to stop monitoring other PO located after the first PO in the paging cycle, the indicator bit of the Paging DCI comprises at least one bit in target reserved bits, and the target reserved bits is one of groups of reserved bits in the Paging DCI; and
in response to determining that content carried by the Paging DCI being different content, determining an information field located by the target reserved bits based on the different content and a number of bits corresponding to the target reserved bits based on the different content.

11. The method as claimed in claim 10, wherein,
the target reserved bits comprise 2 bits in a short-message-indicator information field.

12. The method as claimed in claim 10, wherein,
the target reserved bits comprise 6 redundant bits among 8 bits in a short message information field.

13. The method as claimed in claim 10, wherein the Paging DCI is Paging DCI not carrying paging scheduling information and a short message, and the target reserved bits comprise 2 bits in a short-message-indicator information field; or the target reserved bits comprise 8 bits in a short message information field; or the target reserved bits comprise a frequency-domain-allocation information field; or the target reserved bits comprise 4 bits of a time-domain-allocation information field; or the target reserved bits comprise 1 bit of a mapping information field from a virtual resource block (VRB) to a physical resource block (PRB); or the target reserved bits comprise 5 bits of a modulation-and-coding information field; or the target reserved bits comprise 2 bits of a transport block (TB) ratio information field; or the target reserved bits comprise 6 bits of original reserved bits.

14. The method as claimed in claim 10, wherein the Paging DCI is Paging DCI only carrying paging scheduling information, and the target reserved bits comprise 2 bits in a short-message-indicator information field; or the target reserved bits comprise 8 bits in a short message information field; or the target reserved bits comprise 6 bits of original reserved bits.

15. The method as claimed in claim 10, wherein the Paging DCI is Paging DCI only carrying a short message, and the target reserved bits comprise 2 bits in a short-message-indicator information field; or the target reserved bits comprise 6 redundant bits among 8 bits in a short message information field; or the target reserved bits comprise a frequency-domain-allocation information field; or the target reserved bits comprise 4 bits of a time-domain-allocation information field; or the target reserved bits comprise 1 bit of a mapping information field from a virtual resource block (VRB) to a physical resource block (PRB); or the target reserved bits comprise 5 bits of a modulation-and-coding information field; or the target reserved bits comprise 2 bits of a transport block (TB) ratio information field; or, the target reserved bits comprise 6 bits of original reserved bits.

16. The method as claimed in claim 10, wherein the Paging DCI is Paging DCI carrying paging scheduling information and a short message, and the target reserved bits comprise 2 bits in a short-message-indicator information field; or the target reserved bits comprise 6 redundant bits among 8 bits in a short message information field; or the target reserved bits comprise 6 bits of original reserved bits.

17. An access network device, comprising:

a processor;

a transceiver connected to the processor; and a memory for storing executable instructions of the processor;

wherein the processor is configured to load and execute the executable instructions to perform the method for monitoring a PO according to claim 10.

18. A terminal, comprising:

a processor;

a transceiver connected to the processor; and a memory for storing executable instructions of the processor;

wherein the processor is configured to load and execute the executable instructions to perform:

receiving, at a first PO, paging downlink control information (Paging DCI), carried in a paging physical downlink control channel (PDCCH) scrambled by a paging radio network temporary identity (P-RNTI), from an access network device, wherein a paging cycle of the terminal comprises an original PO and at least one extended PO of the original PO, the original PO and the extended PO form a PO window, the first PO is one of the original PO and the extended PO;

determining to stop monitoring, other PO located after the first PO, in the paging cycle, based on an indicator bit of the Paging DCI, wherein the indicator bit of the Paging DCI comprises at least one bit in target reserved bits, and the target reserved bits is one of groups of reserved bits in the Paging DCI; and in response to determining that content carried by the Paging DCI being different, determining an information field located by the target reserved bits based on the different content and a number of bits corresponding to the target reserved bits based on the different content.

* * * * *